UNITED STATES PATENT OFFICE.

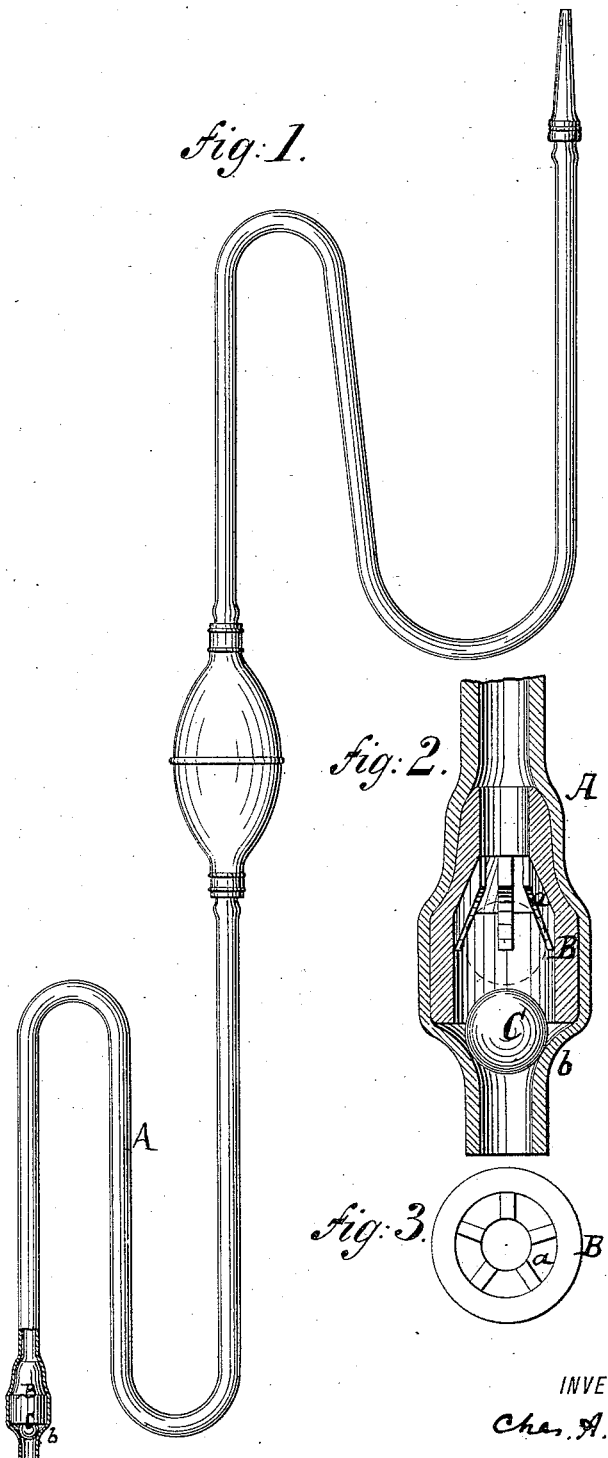

CHARLES A. TATUM, OF NEW YORK, N. Y., ASSIGNOR TO WHITALL, TATUM & CO., OF SAME PLACE.

VALVE FOR SYRINGES.

SPECIFICATION forming part of Letters Patent No. 334,059, dated January 12, 1886.

Application filed October 23, 1885. Serial No. 180,699. (No model.)

*To all whom it may concern:*

Be it known that I, CHARLES A. TATUM, a resident of New York city, in the county and State of New York, have invented an Improved Valve for Syringes, of which the following is a full, clear, and exact description, reference being made to the accompanying drawings, in which—

Figure 1 represents a side view, partly in section, of a syringe having my improved valve. Fig. 2 is a detail central section, on an enlarged scale, of that part of the syringe which contains the valve; and Fig. 3 is a detail end view, on the same enlarged scale, of the metal seat-piece.

This invention relates to an improvement in the valve at the suction end of the syringe or analogous structure, and it consists, substantially, in seating said valve against the rubber body of the syringe, as hereinafter described.

Heretofore the valves at the suction end of the syringe or other similar structure were incased in metal, so that they found their seats in the metal casing and had to be turned true to properly fit their seats.

By my invention the ball-valve, seating against the rubber body, does not require to be fitted or turned true.

In the accompanying drawings, the letter A represents the rubber tube of a syringe. Toward the suction end this rubber tube is drawn over a short metal tube, B, which is open-ended and contains within it a valve-seat, *a*. The short tube or seat-piece B is made larger at the outer end than at the inner, so that the rubber of the tube A, which is drawn over the said tube B, contracts directly beneath the larger outer end of B, as at *b* in Fig. 2, and furnishes by this contraction a seat for the ball-valve C.

Fig. 2 shows the ball-valve resting on its rubber seat *b*, and demonstrates that the body of the tube A serves as a valve-seat, and that, therefore, the ball C need not be turned true. Any ordinary cast ball, or one produced on the plan on which shot is made, will answer the purpose.

The tube B, which expands the rubber tube A, may be of metal, hard rubber, or other analogous substance.

I do not claim seating a ball in a metallic socket in which it is confined by a cross-pin.

I claim—

The combination of the rubber tube A, inner expanding tube, B, and ball C, all arranged with reference to one another substantially as described, so that the valve is free to be seated on the body of the rubber tube where the same folds over the end of the metal tube, as set forth.

CHARLES A. TATUM.

Witnesses:
 EVAN P. GEORGE, Jr.,
 HARRY M. TURK.